United States Patent [19]

Kawamura

[11] Patent Number: 4,788,072
[45] Date of Patent: Nov. 29, 1988

[54] METHOD OF DEHYDRATING FOODS

[76] Inventor: Toshimitsu Kawamura, 4-5-15, Sagamidai, Sagamihara-shi, Kanagawa-ken, Japan

[21] Appl. No.: 910,140

[22] Filed: Jul. 30, 1986

[30] Foreign Application Priority Data

Aug. 15, 1985 [JP] Japan ............................. 60-178609
Oct. 23, 1985 [JP] Japan ............................. 60-235332

[51] Int. Cl.$^4$ ............................................ A23L 1/10
[52] U.S. Cl. ............................ 426/441; 426/464; 426/442; 426/468; 426/506; 426/456; 426/460
[58] Field of Search ............... 426/456, 464, 438, 441, 426/639, 113, 394, 412, 305, 442, 460, 468, 506

[56] References Cited

U.S. PATENT DOCUMENTS

| | | | |
|---|---|---|---|
| 3,881,033 | 4/1975 | Steele | 426/385 |
| 4,137,337 | 1/1979 | Löhr et al. | 426/442 X |
| 4,439,459 | 3/1984 | Swartley | 426/438 |
| 4,542,030 | 9/1985 | Haury et al. | 426/438 X |

FOREIGN PATENT DOCUMENTS 0210855  11/1984  Japan ............................. 426/305

Primary Examiner—Peter Chin
Assistant Examiner—Thi Dang
Attorney, Agent, or Firm—William J. Daniel

[57] ABSTRACT

A method for dehydrating foods by the steps of subdividing the starting food to a suitable size, as by slicing or chopping; blanching the subdivided product in a blanching solution such as brine, acid, sugars; placing the material in a sealed vessel, and while pressurizing the vessel to an elevated pressure of about 1-4 atmospheres above normal, contacting the food pieces with a solution of a sugar adapted to extract moisture therefrom by osmotic action; after sufficient moisture is removed osmotically, rapidly decompressing the vessel to significantly below atmospheric pressure, contacting the decompressed food pieces with a heated liquid oil until the moisture content thereof is not more than about 3% but before the pieces undergo superficial degradation in flavor and color, removing such oil from the pieces to reduce their oil content to about 5-25% by weight, preferably by centrifugation, and cooling the same to room temperature.

24 Claims, No Drawings

METHOD OF DEHYDRATING FOODS

FIELD OF THE INVENTION

The present invention relates to a method of producing dehydrated foods, and more particularly, a method of dehydrating foods, such as fruits, vegetables, meat and shellfish, to a form suitable for packaging and storage which when removed from such packages can be eaten directly, e.g., as an appetizer, or rehydrated by heating with water for mealtime consumption.

A further object is a dehydrating method which produces a dehydrated food product adapted to underto pulverization into finely powdered form.

BACKGROUND OF THE INVENTION

Vacuum frying has conventionally been used as a method for obtaining dried foods for packaging. In vacuum frying, the starting food, such as sliced vegetables, after being immersed in a sugar solution for 6 to 12 hours, is fried in oil in an autoclave, and then drained free of excess oil. This method has low production efficiency because it requires a long time for immersion and frying, resulting in high production cost. Furthermore, an undesirably large amount, up to 40%, of oil is left in the fried product which causes deterioration in quality during long-term storage (oxidation of oil) and affects the smell and taste of the stored product. Furthermore, vacuum fried foods cannot be powdered at normal temperature due to the large content of residual oil. Finally, the original color and taste of the starting food are impaired as well.

It would obviously be desirable to produce dried food products which do not suffer the above defects of the prior art. Thus, a need exists for a method for obtaining high quality dehydrated food products which can be stored for relatively long periods without deterioration in properties, can be produced in a far shorter processing time, are greatly reduced in the amount of residual oil, remarkably retain the natural color and taste of the starting raw material, and are characterized by such dryness and crispness that they are readily adapted for pulverization into finely divided form such as flour or the like.

SUMMARY OF THE INVENTION

In the practice of the present method, the starting food product or material is usually first washed to rinse away dirt and debris, although washing is not an essential step, and then unless its natural size is already suitably small, such as peas, beans and the like, the starting food is subdivided, e.g., sliced or chopped into smaller pieces that can be processed in reasonable processing times. Although the size of the pieces can vary, in general, the maximum dimension is around one inch but is preferably considerably smaller, except in the case of whole small carrots or potatoes, for example, where the original shape is desired to be retained. When the food pieces are in a suitable size, they preferably are first subjected to a conventional blanching operation, as is well known in the culinary art, such as immersing the same in a solution of salt, sugar, or in some cases an acid to preserve the fresh color of the same which can be mildly heated at the same time. Blanching is not required but is useful for certain materials. Unless the starting material naturally has a soft porous texture, such as apples or peaches, the subdivided food pieces are then chilled to subfreezing temperature so as to expand and rupture the cells and promote permeability therein by fluids. Hard, tough vegetables, such as carrots or turnips, especially need the freezing treatment. The subdivided and frozen product, if frozen, is then placed within a sealed vessel, such as an autoclave, or the like, which is equipped for internal pressurization and decompression or evacuation. Preferably, one or more perforated containers are provided within the autoclave, mounted for driven rotation about their axes and, if plural, arranged in a vertical stack on a common axis. While within the sealed container, the food pieces are first contacted with a solution of one or more solutes adapted at appropriate concentrations to extract moisture from the food pieces by osmotic action, preferably a sugar solution, and while such contact is occurring, the interior of the sealed vessel is pressurized to a super-atmospheric pressure to force the osmotically acting solution into the pores or cells of the food pieces. Preferably, the sugar solution is applied to the food pieces by spraying through at least one port in the top of the sealed vessel, while the perforated container therein is undergoing rotation. Spraying contact is considered to be more advantageous then immersion contact for this osmotic treatment to reduce the moisture content. The contact with the sugar solution continues until an appropriate amount of moisture has been removed and the sugar solution can, if desired, be heated during this time, say at a temperature from room temperature up to about 40°–60°–80° C. or possibly higher during this time. Then, the sealed vessel is depressurized and evacuated to reduce its interior pressure to a level significantly below atmospheric, say a few tens of mm Hg. While the osmotically treated food pieces are maintained under this reduced pressure, they are contacted with a heated oil which can actually initially be introduced before the depressurization occurs with the contact thereby continuing after full depressurization. The change in pressure from super-atmospheric to sub-atmospheric needs to take place within a brief period, although not instantaneously. Generally, a depressurization time of about 1–5 seconds is sufficient, the object being to avoid violent disruption or explosion of moisture within the interior of the cells or pores of the food, while on the other hand accelerating volatilization of such internal moisture so that it escapes from the food rapidly and preferably with some slight expansion of the cells or pores of the food. The hot oil is maintained at a temperature within the range of about 80° to almost 100° C. in the case of food and vegetables and higher up to, say 130° C. in the case of meats. The heated oil is also preferably sprayed into the sealed vessel while the food pieces are undergoing rotation and such spraying can continue for a time of about 10–30 minutes but not so long as to result in superficial degradation, i.e., loss in original color or imparting a burnt flavor to the surface of the pieces. The oil contact is continued long enough to reduce the residual moisture in the food to not more than 3% and preferably as low as 1% so as to enhance storage life. When the oil contact has proceeded long enough, the food pieces are removed from such contact and centrifugation by rotating the perforated container in the absence of the addition of fresh oil is effective for this purpose. A suitable but non-critical rotational speed is 650–700 rpm. The food pieces are then cooled to ambient temperature and packaged in sealed, preferably transparent, packages for shipment and storage. The sealed vessel, e.g., autoclave, can have an outlet at its bottom for removal of both the osmotic solution and hot oil and permit these liquids to be recirculated if desired. The osmotic treatment step including pressurization and depressurization can be repeated one or more times after the initial depressurization has occurred and after such repetition is followed by the hot oil treatment step. The treated products have a crisp, brittle texture, adapting them for easy pulverization, and remarkably retain the original color and flavor of the starting food modified by a slight taste of sweetness plus a pleasant perception of the slight residual oil.

DETAILED DESCRIPTION OF THE INVENTION

The foods which can be dehydrated by the present invention vary widely including various kinds of vegetables, fruit, meat, fish and shellfish. Some foods such as peas and beans are naturally small and can be treated as is. Other foods need to be subdivided into smaller pieces which can be more easily and quickly processed. They can be sliced up to about $\frac{1}{2}$ inch or less in thickness or chopped or quartered as the case may be. Small round or tubular vegetables such as carrots and potatoes can be processed whole with diameters, say, up to about one inch with good results.

The method of the present invention is adaptable for the treatment of myriad kinds of food products. Included among these are soft and juicy fruits, such as bananas, peaches, persimmons, kiwis, pears, sand pears, strawberries, blackberries, blueberries, raspberries, pineapple, raisins, plums, cherries, watermelon, cantaloupe, honeydew melon to mention just a few. Harder or more dense fruits can also be readily processed including apples, green pears, pumpkin. Vegetables are particularly suitable including potatoes, both white and red potatoes or yams, carrots, rutabaga, turnips, onions, burdocks, bamboo shoots, green peas, princess peas stringbeans or green beans, field peas, lima beans, cauliflower, broccoli, green peppers, asparagus, garlic, corn kernels. The vegetables can also be of the leafy type such as spinach, Japanese daikon leaves, kale, collards, turnip greens. Nuts can be processed including chestnuts, water chestnuts, pecans, walnuts. Brazil nuts, hazel nuts, etc. The invention is also especially useful for the conversion of meats into durable form including numerous different types of fish and shellfish including sardines, round herrings, pond smelt, shrimp, squid, lobster meat, crab meat, anchoves, scallops, bay scallops, pearl oysters, clams, mussels, and whole fish of not too large size. Among the animal meats can be mentioned beef, pork, veal, lamb, chicken, turkey and other fowl, and these meats can be employed in processed as well as raw form, including sausages of fish meat, pork, beef, bologna, salami, cured ham, cream cheese, cheddar and other hard to semi-hard cheese, boiled fish paste and so on.

Many vegetables as delivered from the field or supplied by a wholesaler unavoidably contain a certain amount of dirt and other debris, and this should be desirably removed from the same before processing. Such dirt and debris would otherwise tend to accumulate during processing and complicate operation of the treatment vessel, e.g., autoclave, and require separate filtration and removal steps.

Once the material is free of extraneous dirt and debris, it is placed into a size or form suitable for the present treatment. In this connection, it should be remarked that the present treatment can in principle be applied to rather thick masses of foods and the like, but such application necessarily involves greatly extending processing times, and it is considerably more convenient to first reduce overly large material to pieces of a size which more convniently responds to the present treatment in appropriately reduced processing times. Thus, the ultimate maximum size that could conceivably be accommodated by the present invention cannot be readily specified, but more convenient sizes are up to a maximum of, say, about one inch and preferably somewhat less than that, say up to about one-half inch in thickness in one dimension. The magnitude of the other two dimensions of the material can, of course, be considerably larger and are limited only by practical and aesthetic considerations, such as appearance, ease of handling, etc. Certain vegetables, such as green peas and other shelled peas, small fruits, such as cherries, grapes and certain berries, are already sufficiently reduced in size that no further subdivision is required, although these items can be cut into smaller sections if preferred. Elongated beans, such as green beans, wax beans, Chinese pea pods and the like would usually be chopped lengthwise, but otherwise left intact unless preferred to be in a julienne form or the like. Carrots, turnips and other root type vegetables would generally need to be sliced into slices of, say, one-fourth to one-half inch in thickness, although considerably in excess of that if preferred, or could be halved or quartered lengthwise and then chopped into sections. Very small immature carrots and whole ears of corn, typicaloy found in Chinese cuisine, can be treated as a whole and may be particularly attractive as appetizers. Avacadoes, pumpkins, squash and melons, such as watermelon, cantaloupe and the like, require removal of the flesh from the rind and subdivision into appropriately sized pieces. Onions and such fruit as apples, pears and peaches, would normally be skinned and then either sliced or quartered with removal of the core or pit if present. Asparagus and bamboo shoots would be handled similar to other elongated vegetables such as green beans mentioned above or smaller slices if preferred. Green peppers would be cored and then sliced into quarters or smaller sections, while leafy vegetables such as spinach, kale and the like would likewise be cut or broken into sections. Bananas would be peeled and cut into slices or quartered lengthwise as preferred.

On the meat side, small fish, after dressing, such as sardines, smelt, tiny shrimp, clams and oysters can be processed as a whole or cut into smaller pieces. Meat items which normally tend to be bulky, such as hams and various sausages and cuts of beef, would be cut into smaller size pieces with a maximum dimension of perhaps up to one inch, although here again a lesser thickness tends to be preferable. As already alluded to, fish, particularly when not overly large, shrimp, squid, scallops and so forth, can be processed whole or reduced to smaller size pieces as the case may be. Octopus would normally be cleaned or dressed to remove unedible portions and the edible portions cut into suitable sections.

Garlic would be separated into cloves and the cloves either left intact or quartered or chopped dependent upon their original size and intended use.

Once the food material to be treated is of a suitable size, it is preferably subjected to a blanching treatment as is known and commonly practiced in the culinary art particularly for removing the skins of various skinned vegetables and fruits or preserving their original color and appearance. As is well known, various blanching treatments are known dependent upon the food or vegetable being treated, and such variations will be equally applicable here. It may be enough in certain cases simply to immerse the item in water for a short period of time, but more generally the water will be heated up to around the boiling point or possibly less. The treatment time is typically brief, as short as one minute, but can be extended much longer when necessary. Various additives can be added to the blanching solution of which salt is the most notable and preferred example. Many fruits and some vegetables are susceptible to oxidative discoloration on a freshly cut surface, and it is known to prevent such discoloration by adding to the blanching solution acidic materials such as ascorbic acid, malic acid, citric acid, lemon juice or sugar used particularly in connection with bananas, apples, avacadoes, and the like. The concentration of any such additive would be determined from known experience, and in the case of brine, the preferred blanching solution, the concentration can range as high as 20–30%. Most commonly, however, low concentrations will be employed, say, up to 3% or so, so as to avoid imparting to the final product a salty taste, unless, of course, a salty taste is deliberately sought. Similarly, the preferred concentrations for other additives would be below that which would leave a residual taste, and thus detract from the natural taste of the material being processed. A preferred blanching temperature might be in the range of 40°–60° C., although lower temperatures down to room temperature are frequently useful, and higher temperatures up to the boil might also serve well if contact time were limited. At lower temperatures, contact times of one-half to one hour might be suitable, although often much shorter contact time will be indicated so as to avoid any deterioration or degradation even superficially or the blanched product.

Generally speaking, blanching treatments are not as such applicable to meats and thus if meats are to be processed, the blanching treatment would normally be omitted. However, it is known to soak certain organ meats such as sweetbreads and liver in aqueous solutions to facilitate the removal of adhering membranous matter and the like. Similarly, it is known to immerse certain meats particularly pork and beef in saline solutions so as to achieve a corning or salting effect. While such operations are not in any real sense the equivalent of blanching, they occur at the same point in the inventive sequence of operations and could be substituted for a true blanching treatment if desired for a given product. The same applies to marinades for various meats and indeed some vegetables. Along the same line, certain meats, particularly fish, and fruits are often subjected to poaching or a light cooking in liquid which may be seasoned or flavored, and such a treatment could readily be employed here at the blanching stage.

A preferred next step for the blanched product is freezing to subzero temperatures in order to modify the internal cellular structure of the fruit or vegetable to promote its permeability to fluids both gaseous and liquid. Certain items naturally have a soft porous texture, e.g., apples, peaches and melons and the like, but others have a hard, tough character; and typical examples of this category are carrots, hard pears, turnips and pumpkins. All natural food products naturally contain a certain amount of internal moisture and when frozen to below subzero temperatures, say at least −10° C. to −30° C. or below, the water in their cells expands while in solidified condition. Such expansion disrupts the cell walls or membranes and results in a more open or porous internal texture which is more readily permeable to penetration by liquids and volatiles. Obviously, some discretion has to be exercised as regards the freezing step in view of the fact that that step is quite important for certain foods but is contraindicated for other naturally soft foods, rendering them undesirably mushy.

Essentially the steps discussed up to this point are preliminary in nature and basically optional in the practice of the present invention, being employed or omitted as circumstances dictate or suggest. The following steps of the invention, in contrast, are indispensable and are necessarily included as essential aspects of the inventive concept, although particular conditions selected therefor can vary rather widely as will be developed.

Following the completion of the above preliminary steps, the food item to be processed is then brought into contact with an osmotically-active solution effective to extract moisture, i.e., water, from the food item via an osmotic action. It is known in the art that solutions of certain solutes are effective when brought into contact with food products to achieve a dehydration or reduction in the available moisture level therein of a significant degree. For one description of this known technique, reference may be had to the text *Canned Foods—Thermoprocessing and Microbiology* by Hersom and Hulland, 7th Edition 1981, Chemical Publishing Company, particularly at pages 34–41. A variety of solutes are recognized as effective for this osmotic treatment, including salts, polyols and proteins to mention just a few; and while these could in principle be employed in the practice of the present invention, as a practical matter the osmotically activesolution employed here is a solution of a sugar at a concentration capable of achieving osmotic activity. The term "sugar" is employed broadly here, comprehending monosaccharides, such as dextrose and fructose, disaccharides, such as maltose, lactose and sucrose, as well as certain soluble or dispersible polysaccharides, such as starch. It is recognized that monosaccharides tend to be more efficient in reducing the water content at lower concentrations than disaccharides such as sucrose, and thus the monosaccharides tend to be preferred. Mixtures of these sugars can be used in various proportions, and in practice such mixtures may be found more advangageous.

The concentration of the sugar in the osmotically active solution can vary widely ranging from about 10 to about 50% by weight, and some experimentation may be needed in a specific instance in order to arrive at the most effective concentration. Ordinarily, concentrations of about 10–30% will prove more useful. The time of contact between the osmotically active solution and the food item can vary considerably, but will generally range from about one-half to one and one-half hours or longer, and in any case the time is not seen as having particular criticality. The objective of this step, as stated above, is to extract moisture from the preliminarily prepared food, but no precise limitations can be specified for the permissible residual water concentration from this step the following step likewise has a dehydration or moisture reducing result. It is the ultimate moisture content that is of importance here, and the contribution of each of the separate steps to that objective may consequently be adjusted considerably so long as the ultimately reduced moisture content is achieved.

The kind of contact between the osmotically active solution and the food item can be varied. Simple immersion can be employed but is less preferred than spray type contact, especially where the spray is impinged upon the food pieces while in motion, for example, undergoing rotation within a perforated basket or like porous container. It is not necessary that all of the exposed surfaces of the individual food pieces make contact with the osmotically active solution since the osmotic treatment can be accomplished quite well where contact exists with only one surface of the food, particularly where the porosity of the food has been enhanced as described above.

The osmotic treatment is effected in conjunction with a sequence of pressurization and depressurization applied to the food item undergoing treatment, and, therefore, this step needs to be carried out while the food item is contained within a sealed vessel which is adapted to be subjected to pressurization, say in the range of about 1-7 atmospheres above normal pressure as well as depressurization or evacuation down to a vacuum in the range of, say, 70-10 mm Hg, although lesser vacuums for longer periods of time should be equally suitable.

The temperature of the osmotic treatment is generally in the range of 60°-80° C. and not in excess of the boiling point for fruits and vegetables but can possibly go higher, say, up to about 130° C. in the case of meat. Pressurization is preferably achieved by the use of steam since the steam itself is capable of supplying at least some of the necessary heat to the system while serving equally as an effective pressurizing medium. Other pressurizing gases could in principle be substituted but would achieve no advantage over steam and would be subject to the disadvantagee of failing to compensate for the chilling effect that occurs during the depressurization phase. External heating could then be used and is preferably available in any case.

The durations of the pressurization and depressurization/evacuation stages, respectively, are not particularly critical and are generally in the order of a few minutes each, say 1-10 minutes or so, but can be extended, if needed. As a practical matter, the time required for the pressure to reach a predetermined maximum, e.g., about 4 atmospheres or higher, will often serve for the pressurization stage and is to be followed by a more or less similar time of depressurization in the order of ordinarily 3-6 minutes or so.

The purpose of the pressurization phase is to force the osmotically active solution into the pores of the food item being treated so as to promote the efficiency of the osmotic effect. Conversely, the purpose of depressurization is to volatilize the moisture content within the pores of the cells and to achieve rapid extraction of the moisture therefrom. In order to achieve a combination of these results, the interval between maximum pressurization and maximum evacuation should be suitably brief but not instantaneous. It is possible, particularly with high pressurization in excess of 4 atmospheres, to cause a literal explosion of the food product if the pressure is reduced with extreme suddenness or instantaneously, and this should be avoided. In general, if the pressure change is allowed to occur over a few seconds, say 1-5 seconds, the results are acceptable and product integrity is maintained. Some modest expansion of the food item may in certain cases, such as potatoes, be permissible or even advantageous, but an explosion or literal disruption thereof due to a sudden pressure drop is certainly not desirable.

The pressurization and depressurization stages of the osmotic treatment can be repeated one or more times combined with re-application of the osmotic solution, and this option carries the possibility of utilizing shortened individual stages with a sufficient number of repetitions as to achieve the needed overall result. Incidentally, the evacuation can be employed as a convenient means of extracting surplus osmotically active solution by connecting a bottom outlet from the sealed vessel or autoclave to a vacuum line so that any excess solution is sucked out through the outlet automatically upon initiation or depressurization. Of course, depressurization could be accomplished in other ways through the top of the vessel, and in that instance, the surplus osmotic solution must be removed in other ways.

The osmotic solution can, and preferably is, removed continuously from the bottom of the vessel as it is being sprayed through the top with suitable recirculation, and the recirculation can incorporate one or more filtration stages if needed.

When the osmotic treatment has been carried as far as desired, the food item is then subjected to contact with a heated oil which is liquid at the contact temperature. Here again, the contact can in principle occur by way of immersion, but it is far preferable to employ also here the same spraying contact as for the osmotically active solution. Thus, the oil can be injected through one or more spray ports in the top of the sealed vessel, particularly if the food pieces therein are maintained in a state of rotation within the perforated basket or the like. The temperature of the oil for this step is generally in the range of 60°-80° C. and in any case less than the boiling point for fruits and vegetables, and in the range of 60°-120° C., and in any case less than about 130° C. in the case of meat. The duration of the oil contact is within the range of about 10-30 minutes generally speaking and preferably about 20 minutes, for instance, in the case of the treatment of, e.g., apples. The objective of the oil contact is again to achieve a dehydration of the food being treated, the hot oil serving to replace the moisture remaining in the osmotically treated food and drive the same, especially at temperatures above boiling, out of the pores or cells of the food, and the ultimate criteria for determining the treatment time is consistent with this objective.

Although the final moisture content is ultimately determined by practical considerations, e.g., the shelf-life required for a specific product, etc., the moisture content of the final food product should usually be not more than about 3%, and in many cases less than that, say 1%. This low moisture content promotes product life and good shelf stability; whereas higher moisture contents tend to lead to fairly rapid deterioration. For instance, the products of the present invention have been found, when packaged in sealed packets, to have a shelf life at least of about 6-12 months or longer in contrast with a shelf life of about 3 months for similarly packaged conventional vacuum fried dehydrated food products. It follows that the duration of the oil treatment, ultimately speaking, needs to be consistent with the achievement of this objective while at the same time care is taken to avoid any deleterious influence on the desirable qualities of appearance, taste and texture of the ultimate product by reason of excessive oil treatment. For instance, the oil treatment if extended too long can result in a kind of superficial burning of the product, leaving an unpleasant aftertaste reminiscent of a burned food even though the nominal appearance of the product does not suggest the occurrence of burning. It should be pointed out in this connection that the osmotic treatment has an important cooperative association with the oil treatment in avoiding such burning. Thus, if the osmotic treatment step were to be omitted, the oil treatment would tend to produce burning of the surface of the product being treated, i.e., cause an over-dehydration of the surface strata of the product while leaving the interior of the same with an undesirably high moisture content. Thus, the osmotic treatment and the oil treatment work hand in hand in accomplishing the overall necessary reduction in the moisture content while avoiding surface degradation or deterioration of the product.

Liquid oils can be used for the oil treatment as can solid oils provided they assume a liquid state at the treatment temperature. Palm oil has been found particularly advantageous since it yields a product that is peculiarly resistant to synersis; namely, the gradual leakage of moisture on the product surface under summer conditions of heat and humidity.

Due to the nature of the present process, the specification of precise or exact treatment times and temperatures is difficult, if not impossible, in any realistic sense. The ultimate test is unavoidably the quality of the final product and some experimentation may be required in order to arrive at the optimum combination of treatment temperatures and times for specific products, and indeed specific crops or degrees of ripeness of given food items inasmuch as the composition of the same item can vary from one crop to another and such variations may call for some modification of the treatment conditions. It is advisable to employ a sealed vessel equipped with an observation port so that the condition of the product being treated at the various stages can be observed which facilitates the exercise of reasonable discretion as to the choice of operating conditions. Also, experience in the execution of the present process is a valuable aid in arriving at suitable conditions for a specific item, and once such experience has been acquired, one is able without difficulty to produce satisfactory products.

From what has been explained, the present method is not limited to particular forms of apparatus. However, an autoclave equipped with one or more rotatably driven baskets contained therein has been found most useful. It is also advantageous if the internal basket can be rocked while within the sealed autoclave so as to achieve some agitation of the food pieces contained therein. With such a system, the speed of the rotation of the basket can be adjusted to suit particular conditions.

The above description implies that the osmotic treatment and the oil contact occur separately in the described sequence. Such operation has the advantage of simplicity as regards the control of the system but is not essential. For example, the heated oil can be injected into the closed vessel a short time, say, 10 seconds or so, before the evacuation of that vessel is initiated, and this preliminary introduction of the heated oil does not appear to interfere with the objective of the evacuation of extracting through volatilization much of the residual moisture content of the osmotically treated food item. The oil treatment is in any case continued beyond the evacuation so as to insure contact of the oil with the food pieces while they are maintained in a state of evacuation so as to promote penetration of the oil into their cells or pores. In principle, the osmotic treatment and oil contact stages can be combined or carried out more or less simultaneously, but this introduces unneeded complications, achieves no advantage or improved results and may be better avoided. In particular, the concurrent presence of the sugar solution and oil within the sealed vessel while the container is undergoing rotation can lead to a kind of emulsification and foaming state which can tend to interfere with the objectives of the individual steps.

After the oil contact has continued for a time sufficient to reduce the moisture content of e food pieces below the desired maximum ultimate level of about 3%, such contact is terminated and the food pieces manipulated so as to extract to a substantial degree the residual oil. Centrifugation of the food pieces is a preferred way to this end, using rotational speeds in the order of several hundreds rpm, say 600–700 rpm, although higher or lower speeds could be substituted or variable speeds as preferred. In the system as described above, this can be desirably achieved by terminating further injection of the oil into the vessel, removing collected oil from the interior of the vessel and then rotating the perforated basket at the desired speed. Alternatively, the treated products could be equally, although less conveniently, dumped from the autoclave into a separate centrifugation extractor and thus centrifuged to remove excess oil.

The amount of oil remaining in the finally treated product varies with the kind of food being treated. In some few instances an oil content as high as 20–25% or even higher may be permissible or even desirable, e.g., for apples. On the other hand, generally for most vegetables and meats the residual oil content should be less than 15%. For example, a good residual oil content for beans is 10% and for onions is about 5% which represents approximately the lowest level reasonably achievable. In any case, all excess oil is removed so that the surfaces of the treated food pieces appear free of oil even upon squeezing and only the slightest perception of oil remains to the touch and taste. In general, a centrifugation of more or less 10 minutes at a temperature of 70°–80° C. gives good results with the autoclave being allowed to cool off gradually during this time. Instead of a single oil, combinations of oils can be blended in order to impart maximum resistance against oxidation.

The products of the present invention are characterized by a unique combination of properties in dried foods. As mentioned, they have a very advantageous low moisture content of not more than 3% and much lower if desired, for example, 1% for apples. The natural color of the food items is preserved to a remarkable degree, and they have a low acid value of less than about 2, expressed as a KOH number. Their natural shape, at least as subdivided, is generally retained subject to some slight expansion as in the case of string beans and round potatoes. They have a dry, crisp, crunchy texture which tends to be virtually homogeneous throughout their thickness. This contrasts with many so-called dried foods which have a considerably softer interior or center which is indicative of an excessively high moisture content in those regions and of an ultimately reduced storage life. They also contrast with conventional dried products in the absence of toughness or chewability as the above mentioned crispy, crunchy nature would suggest. They have a pleasant, even delicious taste, reminiscent of the natural food product consistent with the absence of moisture therein with a slight suggestion of sweetness due to the osmotic treatment with the sugar solution. However, the sugar taste is not overpowering, and the food products, unless deliberately sought, do not have an overly sweet flavor.

Their slight residual oil content is perceptible to the taste, but this is in no way objectionable; and an undesirable greasy, oil surface is not present. Nor due they feel greasy or oily to the touch when handled.

The present products constitute a very tasty appetizer or snack when consumed in their final dry state upon removal from their sealed package. On the other hand, they can be soaked in heated water so as to achieve a reconstitution and used in that way as vegetables or fruits for mealtime consumption, and they are equally palatable in this form. Incidentally, the presence of the residual sugar in the ultimate food product, particularly at the surface, is actually advantageous where reconstitution with water is to be practiced because the residual sugar especially at the product surface goes readily into solution during rehydration and soaks easily into the open pores of the product, thereby accelerating and promoting rehydration.

A unique feature of the present products is their ability to undergo ready pulverization into finely powdered form. Conventional vacuum fried products typically are tough and flexible and can hardly be pulverized at all. By virtue of the dry, crunchy texture of the present products, they can be ground into fine powder without complications, and this dry powder form has advantageous implications for many purposes. For example, mixing of the present product with other foods is to be greatly facilitated, and the powdered form can be used for unconventional but potentially delicious concoctions, for example, breads or cakes made by apple, peach or even carrot flour.

The practical execution of the present process will be further illustrated and explained by the following examples:

EXAMPLE 1

(1) Onions from the market are washed, peeled, sliced or quartered, and immersed in brine (salt content: 3-4%) at 40°-60° C., specifically 45° C., for 1-3 minutes, specifically 2 minutes. Onions are then rapidly cooled in cold water to preserve freshness.

(2) Materials thus pretreated in step (1) above are charged in a rotatably driven wire basket placed in an autoclave which can be pressurized/depressurized.

(3) Uni-directional osmotic solution containing 10% of maltose, 20% of dextrin, 20% of lactose and 50% of water is mixed in a solvent tank. The osmotic solution is adjusted in temperature to 70°-80° C. and injected by means of a pumping nozzle. The basket in the autoclave is gently rotated, e.g. 30-50 rpm, so that the osmotic solution will permeate thoroughly into the onions. At the same time, steam is injected from a separate nozzle to elevate the pressure in the vessel. Injection of steam is suspended when a pressure of 2 kg/cm$^2$ (=ca 2 atmospheres). Then a port in the bottom of the autoclave is connected to a vacuum duct (5-20 mm/Hg) to rapidly reduce the pressure. The pressure is initially reduced in a few seconds to 60 mm/Hg and then to 20 mm/Hg or lower after 3 to 5 minutes. These steps are repeated. Then oil (hardened oil such as cotton seed oil and palm oil, preferably the latter) is heated in a tank by a heater to a temperature of 110° C. Injection of steam and osmotic solution into the autoclave is suspended as the injection of oil is started. After 1 to 2 minutes, the pressure is rapidly reduced as mentioned above. After about 5-10 minutes, the oil contact is discontinued, and the oil drained from the autoclave. The basket member is rotated at a high speed, e.g. 700 rpm, for 5 minutes under reduced pressure (20 mm/Hg). After suspending the rotation, the pressure is restored to normal and the basket member is taken out from the vessel. Dehydrated onions in slices or quarters thus obtained were excellent in flavor, color, taste and crispness with a residual oil content of less than 5% and water content of less than 1%. Pulverization of the dehydrated onions was very simple. The product has a good aroma especially suited for onion soup and other preserved items. In contrast to the conventional vacuum drying method which required 12 hours for treating 30 kg of onion, the present invention method is capable of treating 150 kg of onion in 1.5 hours.

EXAMPLE 2

Treatment is conducted under the conditions below following the steps of Example 1.
(1) Material: Carrot
(2) Blanching: Fresh carrots are washed, peeled and immersed in brine under the following conditions either in slices or as a whole. After heating or rapidly cooling, carrots are drained and placed in a wire basket.
   (1) brine: salt content 3-4%
   (2) heating: 90°-95° C.
   (3) immersion time: 1-2 minutes
   (4) rapid cooling to about 20° C.
(3) Dehydration by osmotic action and hot oil under elevated/reduced pressures:

Dehydration according to the present invention was conducted for carrots thus pretreated by using a pressurizing/depressurizing autoclave, repeating pressurization and depressurization and using an osmotic solution and hot oil. The following conditions were employed:
   (1) osmotic solvent solution: dextrin 20%, malt syrup 20%, lactose 10%, water 50%; injection temperature 70° C.
   (2) oil mixture of 30% cotton seed oil, and 70% palm oil oil temperature 60°-120° C., specifically 120° C.
   (3) pressurization/depressurization
      Similar to Example 1, cycle of pressurization/depressurization and other conditions for osmotic treatment and oil contact were selected to suit the composition, ripeness and shape of the material to be treated.
      In Example 2, carrots were treated with osmotic solution while pressurizing with steam to 2 kg/cm$^2$. The treatment was repeated several times depending on the amount of material charged. The oil temperature was between 100° and 120° C. and the vessel was maintained at 20 mm Hg for evacuation.
      Carrots thus dehydrated were then centrifuged at 650 rpm for 10-30 minutes, specifically 20 minutes, to remove residual oil to less than 10%. The dehydrated carrots contained less than 1% of water. Original color and flavor were well preserved. When the carrots were cut into balls or, if small, used in their original form (20 mm or less in thickness), the time required for dehydration may somewhat vary.

EXAMPLE 3

The steps described in Example 1 were employed un-er the following conditions:
   (1) Material: spinach (2) Blanching: Spinach is cut to the desired size and washed before pretreating under the following blanching conditions:
  (1) brine: salt content 2-3%
  (2) immersion temperature: 90°-95° C.
  (3) immersion time: 0.5 minutes or less
  (4) rapid cooling to 20° C.
(3) Osmotic treatment and oil contact were carried out generally as before with one following exception:
  (1) osmotic solution: dextrin 10%, lactose 20%, grape sugar 10%; water 60%; injection temperature 40° C.
  (2) oil: mixture of 10% cotton seed oil, 80% palm oil and 10% rice oil oil temperature 90°-105° C., specifically 95° C.
  (3) pressurization/depressurization
    As in Example 1, the cycle of pressurization/depressurization and other conditions for osmotic treatment and oil content were selected to suit the composition, ripeness and shape of the material to be treated. Pressurization was with steam to 2 kg/cm². The osmotic treatment was repeated several times depending on the amount of material charged. The oil temperature was between 100° and 120° C. and the evacuation pressure of the vessel was 20 mm Hg.
    Spinach leaves thus dehydrated were then centrifuged at 650 rpm for 10-30 minutes to remove residual oil to less than 10%.
    The dehydrated spinach contained less than 1% of water. Original color and flavor were well preserved.

EXAMPLE 4

The steps described in Examine 1 were repeated under the following conditions.
(1) Material: apples
(2) Blanching: Fresh apples are washed and sliced before immersing in brine. After draining, apples are treated to prevent discoloration and to preserve freshness and then placed in a wire basket.
  (1) brine: salt content 3%
  (2) heating: not conducted
  (3) immersion time: 60 minutes
  (4) rapid cooling to 10° C
(3) Dehydration by osmotic action under elevated/reduced pressures and oil contact:
  (1) osmotic solution; malt syrup 10%, dextrin 10%, lactose 5%, cornstarch 10% (cornstarch is to be dispersed), water 70% injection temperature 50° C.
  (2) oil: mixture of 10% cotton seed oil, 80% palm oil, 10% rice oil oil temperature 90°-105° C.
  (3) pressurization/depressurization Pressurization was with steam to 2 kg/cm². The osmotic treatment was repeated several times depending on the amount of material charged. The oil temperature was between 95° and 105° C. and the evacuated vessel was maintained at 15 mm Hg. Apples thus dehydrated were then centrifuged at 650 rpm for 10-30 minutes to remove residual oil to less than 10%. The dehydrated apples contained less than 1% of water. Original color and flavor were well preserved.

EXAMPLE 5

The steps described in Example 1 were repeated under the following conditions.
(1) Material: sardines
(2) Blanching: Fresh or partially dried fish is rinsed and immersed in brine in the original form under the following conditions and drained and placed in a wire basket.
  (1) brine: salt content 3%
  (2) heating: not conducted
  (3) immersion time: 30 minutes
  (4) rapid cooling not conducted
(3) Dehydration by osmotic action and under elevated/reduced pressure and oil contact. The following conditions were employed.
  (1) osmotic solvent solution: malt syrup 10%, dextrin 10%, grape sugar 10%, water 70%; injection temperature 60° C.
  (2) oil: mixture of 10% cotton seed oil, 80% palm oil, 10% rice oil oil temperature 90-°110° C., specifically 110° C.
  (3) pressurization/depressurization
    Pressurization was with steam to 3 kg/cm². The treatment was repeated several times depending on the amount of material charged. The oil temperature was between 90° and 110° C. and the evacuated vessel was maintained at 20 mm Hg.
    Sardines thus dehydrated were then centrifuged at 650 rpm for 10 to 30 minutes to remove residual oil to less than 20%. The dehydrated sardines contained less than 2% of water. Original color and flavor were well preserved. As sardines inherently contain oil and fat, amount of residual oil was somewhat higher than other dehydrated products.

EXAMPLE 6

The steps described in Example 1 were repeated under the following conditions.
(1) Material: pork
(2) Blanching: Pork was cut into pieces of a suitable size having a thickness smaller than 10 mm. Fat was removed. After rinsing, pork was immersed in brine, heated and rapidly cooled and drained before treatment. Pork cut into cubes of 10 mm was placed in a wire basket.
  (1) brine: salt content 3-4%
  (2) heating: 90°-95° C.
  (3) immersion time: 1-2 minutes
  (4) rapid cooling to 20° C.
(3) Dehydration by osmotic action under elevated/reduced pressures and oil contact.
  (1) osmotic solution: dextrin 10%, lactose 10%, fructose 5%, malt syrup 10%, corn syrup 5%, water 60%; injection temperature 60° C.
  (2) oil: mixture of 10% cotton seed oil, 70% palm oil and 20% rice oil oil temperature 110°-125° C., specifically 115° C.
  (3) pressurization/depressurization Pressurization was with steam to 2-3 kg/cm². The treatment was repeated several times depending on the amount of material charged. The oil temperature was between 110° and 125° C., specifically 115° C., and the vacuum pressure of the vessel was 20 mm Hg. Pork thus dehydrated was then centrifuged at 650 rpm for 10-30 minutes to remove residual oil to less than 20% The dehydrated product contained less than 2% of water. Original color and flavor were well preserved.

EXAMPLE 7

The steps described in Example 1 were repeated under the following conditions.

(1) Material: potatoes
(2) Blanching: Fresh potatoes were washed and peeled. Potatoes in slices or sticks, or whole, if small, were heated and rapidly cooled under the conditions described below, and then drained and treated to preserve freshness before placed into a wire basket.
   (1) brine: salt content 3-4%
   (2) heating: 95°-98° C.
   (3) immersion time: 2-3 minutes
   (4) rapid cooling to 20° C.

(3) Dehydration by osmotic solution under elevated/reduced pressures and oil contact.
   (1) osmotic solution: dextrin 10%, malt syrup 5%, water 85%; injection temperature 50° C.
   (2) oil: mixture of 5% cotton oil, 80% palm oil and 15% rice oil oil temperature 90°-110° C., specifically 105° C.
   (3) pressurization/depressurization
      Pressurization was with steam to 2 kg/cm². The treatment was repeated several times depending on the amount of material charged. The oil temperature was between 90° and 110° C., specifically 105° C. The vacuum within the vessel was at 15 mm Hg. Potatoes thus dehydrated were then centrifuged at 650 rpm for 10-30 minutes to remove residual oil to less than 10%. The dehydrated product contained less than 1% of water. Original color and flavor were well preserved.

Dehydrated products obtained in the Examples above can be pulverized and used as a material for preparing confections, soup and other processed foods.

The following tables compare products of the present method with similar products obtained by known methods as to the stated properties.

TABLE I

| Food | Residual Oil Content | | |
|---|---|---|---|
|  | Normal pressure frying method | Vacuum frying method | Present invention |
| Potatoes | 40% or more | 30-40% | 10-15% |
| Apples | 40% or more | 15-20% | 5-10% |
| Carrots | 40% or more | 10-15% | 5-10% |

TABLE I-continued

| Food | Residual Oil Content | | |
|---|---|---|---|
|  | Normal pressure frying method | Vacuum frying method | Present invention |
| Pumpkins | 35% or more | 15-25% | 10-15% |
| Onions | 40% or more | 15-25% | 5-15% |

TABLE II

| Food | Water Content | | |
|---|---|---|---|
|  | Normal pressure frying method | Vacuum frying method | Present invention |
| Potatoes | 30% or more | 2.0-5.0% | 1.0-3.0% |
| Apples | 40% or more | 1.0-3.0% | 0.5-2.0% |
| Carrots | 35% or more | 1.0-3.0% | 0.5-2.0% |
| Pumpkins | 30% or more | 1.0-5.0% | 0.2-3.0% |
| Onions | 80% or more | 3.0-6.0% | 0.5-2.0% |

TABLE III

|  | Time | Change After Lapse of Time | | | | | | | |
|---|---|---|---|---|---|---|---|---|---|
|  |  | Apples | | Onions | | Carrots | | Pumpkins | |
|  |  | AV¹ | POV² | AV | POV | AV | POV | AV | POV |
| Vacuum frying method | When manufactured | 0.2~1.5 | 3.0~6.0 | 0.2~2.5 | 3.0~6.0 | 0.2~0.5 | 4.0~6.0 | 0.2~1.0 | 6.0~7.0 |
|  | after 6 months | 3.0~6.0 | 15.0~45.0 | 0.5~10.0 | 15.0~50.0 | 0.5~6.5 | 10.0~35.0 | 1.5~3.5 | 10.5~35.0 |
| Present Invention | When manufactured | 0.1 or less | 2.0 or less | 0.1 or less | 2.5 or less | 0.1 or less | 2.0 or less | 0.1 or less | 2.0 or less |
|  | after 6 months | 0.2~1.0 | 6.0~25.0 | 0.2~1.0 | 5.0~15.0 | 0.2~1.0 | 3.0~20.0 | 0.2~1.5 | 3.0~15.0 |

AV = acid value
POV = peroxide value

What is claimed is:

1. A method of preparing a dehydrated food product which comprises subdividing the food to be dehydrated into pieces of desired size; contacting said food pieces within a sealed vessel with an aqueous solution of a sugar of a concentration sufficient to absorb water from said food pieces by osmotic action while elevating the pressure within said vessel to force said solution into the cells of said food pieces; when sufficient water is absorbed by said osmotic action terminating such contact and immediately reducing the pressure within said vessel significantly below atmospheric pressure to promote rapid volatilization of moisture of said solution from said cells but without violently disrupting those cells; while said food pieces are under reduced pressure, contacting the same with an edible oil heated to at least about 90° C. but below the temperature at which the food pieces would undergo superficial degradation, such contact with said oil continuing for a time sufficient to reduce the moisture content of a final food product defined by said food pieces to a level adequate for storage life; and then removing unabsorbed oil from said food pieces and cooling the thus-treated food pieces to ambient temperature.

2. The method of claim 1 including the step of subjecting the subdivided food pieces to a blanching treatment prior to contacting the same with said sugar solution.

3. The method of claim 1 wherein at least one perforated container is disposed within said sealed vessel and said food pieces are located within said at least one perforated container while within said vessel.

4. The method of claim 3 wherein said at least one container comprises a plurality of perforated containers which are arranged within said sealed vessel in a vertical stack.

5. The method of claim 3 wherein said at least one perforated container is rotated about a vertical axis within the sealed container and said sugar solution is sprayed onto the food pieces within the thus-rotating container.

6. The method of claim 5 wherein said food pieces within said at least one perforated container are held free of immersion in the sugar solution.

7. The method of claim 5 wherein said vessel includes an outlet at its bottom and including the step of withdrawing the sugar solution from the bottom and recirculating the same for further spraying on the rotating food pieces.

8. The method of claim 1 wherein said sealed vessel is pressurized with steam while said sugar solution is being contacted with the food pieces therein.

9. The method of claim 1 wherein the pressure within said sealed vessel is reduced from said elevated pressure to said pressure below atmospheric in about 1–5 seconds.

10. The method of claim 5 wherein said heated oil is introduced into said vessel for contact with the rotating food pieces by spraying generally through the top of said vessel.

11. The method of claim 10 wherein the introduction of said heated oil by spraying is initiated before the pressure within said vessel is completely reduced to said pressure below atmospheric and continues while said vessel is under said pressure below atmospheric.

12. The method of claim 1 wherein said heated oil is contacted with said food pieces continuously for about 10–30 minutes.

13. The method of claim 1 wherein said food pieces are maintained free of immersion in said heated oil and said oil is recirculated for further contact therewith.

14. The method of claim 3 wherein said heated oil is removed from said food pieces after said contact with said heated oil by centrifugal force created by rotating said at least one perforated container about its axis at a sufficiently high rotational speed.

15. The method of claim 14 wherein the final content of said oil on said food pieces is in the range of 5–25%

16. The method of claim 1 wherein said oil is palm oil.

17. The method of claim 1 wherein said oil is a normally solid oliaginious material which is molten at the temperature of the oil when it contacts the food pieces.

18. The method of claim 1 wherein after said step of reducing said sealed vessel to said pressure below atmospheric, the step of contacting the food pieces with said sugar solution is repeated while pressurizing the vessel above atmospheric pressure and then said vessel pressure is then reduced to below atmospheric pressure.

19. The method of claim 1 wherein said sugar solution is heated to a temperature in the range of about 20° C. to 60° C.

20. The method of claim 1 wherein said food pieces are contacted with said heated oil until the moisture content thereof is reduced to not more than about 3% by weight.

21. The method of claim 1 further includes a residual oil content which is reduced to not more than about 25% by weight.

22. The method of claim 1 including the step of packaging the thus-treated food pieces within a generally non-porous package after cooling.

23. The method of claim 2 wherein said food pieces are blanched by immersion in a brine solution having a concentration of at least about 1% but not enough to impart a salty taste to the ultimate food product.

24. The method of claim 2 including the additional step of chilling the blanched food pieces to subzero temperature for a time sufficient to expand by freezing the cellular water thereof and thereby effect cellular wall disruption.

* * * * *